United States Patent [19]
Wieber et al.

[11] Patent Number: 5,430,979
[45] Date of Patent: * Jul. 11, 1995

[54] STRUCTURE CLAD WITH TENSIONED CLADDING MEMBRANE

[75] Inventors: Robert F. Wieber, Glenwood; David P. Capezzuto, West Seneca; John D. Hayes, Sanborn, all of N.Y.

[73] Assignee: Birdair, Inc., Amherst, N.Y.

[*] Notice: The portion of the term of this patent subsequent to Nov. 16, 2010 has been disclaimed.

[21] Appl. No.: 138,775

[22] Filed: Oct. 19, 1993

Related U.S. Application Data

[63] Continuation of Ser. No. 841,714, Feb. 26, 1992, Pat. No. 5,261,193.

[51] Int. Cl.6 .......................... F04B 1/12; E04G 11/04
[52] U.S. Cl. ........................... 52/63; 52/80.1; 52/80.2; 52/81.1; 52/81.2; 52/81.3; 52/82
[58] Field of Search ................ 52/63, 222, 248, 80.1, 52/80.2, 81.1, 81.2, 81.3, 81.4, 81.6, 82

[56] References Cited

U.S. PATENT DOCUMENTS 5,261,193 11/1993 Wieber et al. .......................... 52/63

Primary Examiner—Carl D. Friedman
Assistant Examiner—Christopher T. Kent
Attorney, Agent, or Firm—Howard J. Greenwald

[57] ABSTRACT

A doubly curved structure which is clad with a tensioned, fabric-containing membrane which is disposed above but not contiguous with the exterior surface of the structure. The two ends of the cladding membrane are each connected to an attachment member which, in turn, is attached to the exterior surface; and the intermediate portion of the membrane is contiguous with a standoff member which is disposed between the cladding membrane and the exterior surface. An arc with a substantially concave curvature is formed by such membrane between at least one of the attachment members and the standoff member.

19 Claims, 5 Drawing Sheets

STRUCTURE CLAD WITH TENSIONED CLADDING MEMBRANE

CROSS-REFERENCE TO RELATED PATENT APPLICATION

This application is a continuation of applicants' application U.S. Ser. No. 07/841,714, now U.S. Pat. No. 5,261,193.

FIELD OF THE INVENTION

A structure containing an exterior surface which is both vertically and circumferentially curved and which is clad with a tensioned, fabric-containing cladding member which is not contiguous with the exterior surface of the structure.

BACKGROUND OF THE INVENTION

Structures with curved surfaces, such as egg-shaped anaerobic digesters, have found widespread commercial use. Thus, for example, in an article entitled "Egg-shaped anaerobic digesters" (published by John P. Garvin et al. in the September, 1987 issue of "Pollution Engineering" magazine [Pudvan Publishing Company]), it is disclosed that "The use of steel egg-shaped anaerobic digesters is a well-developed and proven technology for the digestion of sewage sludge"

Egg-shaped anaerobic digesters are doubly curved, i.e., they present both vertically curved and circumferentially curved surfaces. Because of these doubly curved surfaces, anaerobic digesters are difficult to both cover and insulate properly.

It is an object of this invention to provide a structure containing an exterior surface which is both vertically and circumferentially curved and which is clad with a tensioned, fabric-containing cladding member which is not contiguous with the exterior surface of the structure.

It is another object of this invention to provide a relatively inexpensive process and apparatus for covering and insulating a structure with a curved exterior surface to provide efficient and durable protection to such structure.

SUMMARY OF THE INVENTION

In accordance with this invention, there is provided a doubly curved structure which is clad with a tensioned, fabric-containing membrane which is disposed above but not contiguous with the exterior surface of the structure. The two ends of the cladding membrane are each connected to an attachment member which, in turn, is attached to the exterior surface; and the intermediate portion of the membrane is contiguous with a standoff member which is disposed between the cladding membrane and the exterior surface. An arc with a substantially concave curvature is formed by such membrane between at least one of the attachment members and the standoff member.

DESCRIPTION OF THE DRAWINGS

The present invention will be more fully understood by reference to the following detailed description thereof, when read in conjunction with the attached drawings, wherein like reference numerals refer to like elements, and wherein.

DESCRIPTION OF THE PREFERRED EMBODIMENTS

Figure 1:
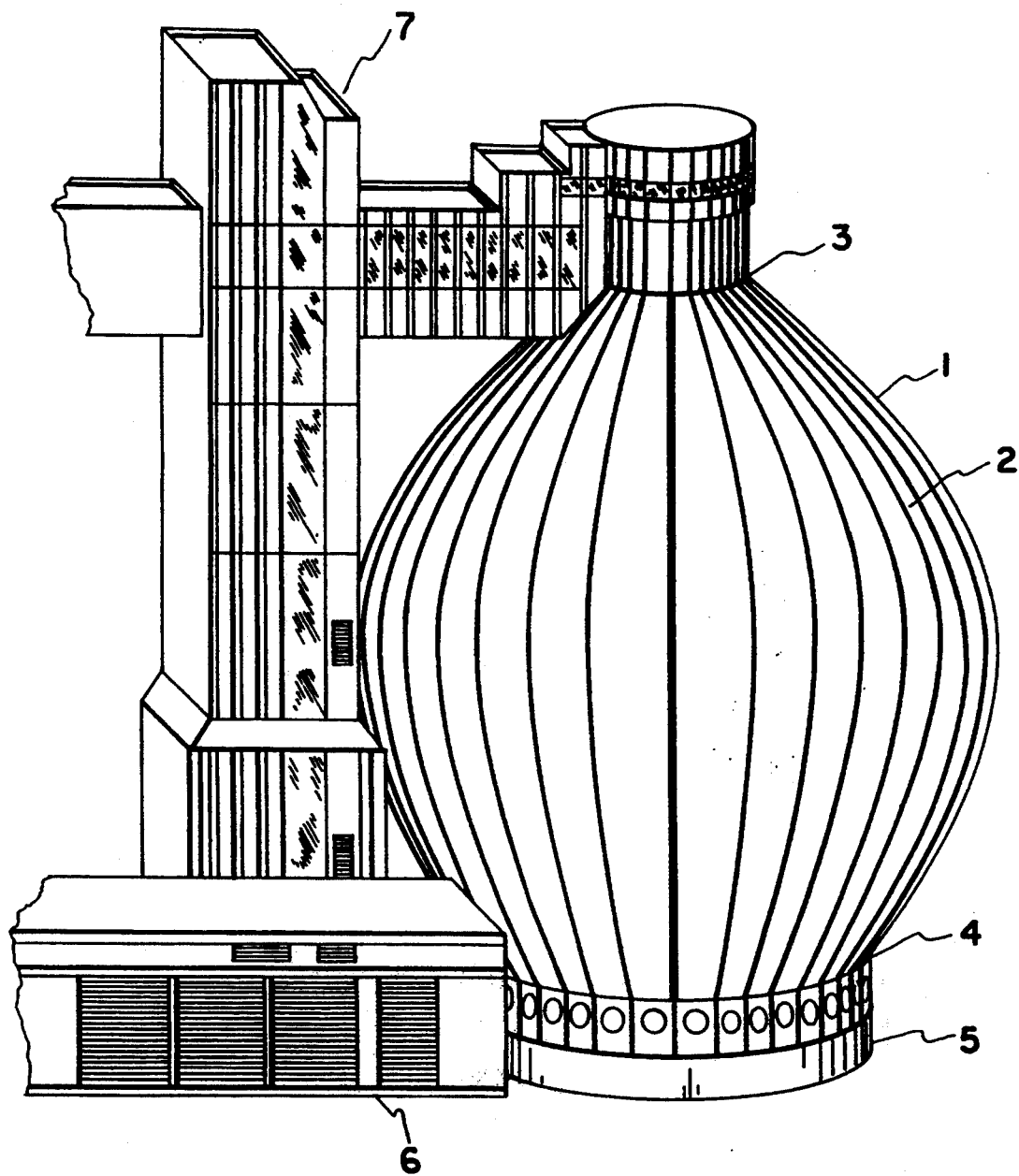
FIG. 1 is an orthogonal projection depicting a preferred cladding system installed on a multi-curved structure.

Referring to FIG. 1 of the appended drawings, tank 1, a large structure with a multiply curved surface (both vertically and circumferentially) is illustrated. This type of tank structure is commonly used for the storage or processing of organic materials. Structures such as these have a high vertical orientation and require a surface topography suited to the processes and equipment for which the interior of the tank is designed. Moreover, because such large and odd-shaped structures may be located in proximity to residential or scenic landscapes, it is preferable that they be clad to present a pleasing appearance to the public.

Referring again to FIG. 1, it will be seen that the the vertically and circumferentially curved surface of tank 1 will be difficult to cover efficiently and aesthetically with traditional rigid or overlappping building materials, such as siding or panels. This is especially true due to the fact that siding must typically be applied in a horizontal fashion in order to provide a shingled surface for water runoff. In the embodiment illustrated in FIG. 1, membrane 2, having a vertically ribbed surface that follows all the curvatures of the tank, provides a much improved flexible system of covering the structure of the tank.

In one preferred embodiment, the cladding membrane 2 is a flouropolymer- or flouroelastomer-coated fiberglass fabric, such as "TEFLON"-coated fiberglass fabric. As is known to those skilled in the art, "TEFLON" is a poly (tetrafluoroethylene) polymer. The use of this type of coated fiberglass fabric provides a weather barrier and protects the curved surfaces being clad from the elements.

Other coated fabrics which provide a suitable weather barrier also may be used. Thus, for example, one may use other thin membranes which create a weather barrier, such as, e.g., membranes consisting of reinforced polyvinyl chloride, silicone- or rubber-coated membranes, and many other synthetic and/or natural materials. Thus, e.g., the membrane material(s) may be woven or nonwoven, or reinforced or unreinforced, fabric, film, and laminate, and the like.

In the structure illustrated in FIG. 1, it can be seen that the fabric, membrane 2, presents a ribbed vertical appearance terminating in top closure collar 3 and bottom closure collar 4 adjoining structural base 5. Service building 6 and accessory or gantry building structure 7 are shown here to illustrate the context of this particular clad structure. Although, structural features vary from one structure to the next, this invention is adaptable to cover a variety of structures and is not limited to the embodiment of FIG. 1.

Figure 2:
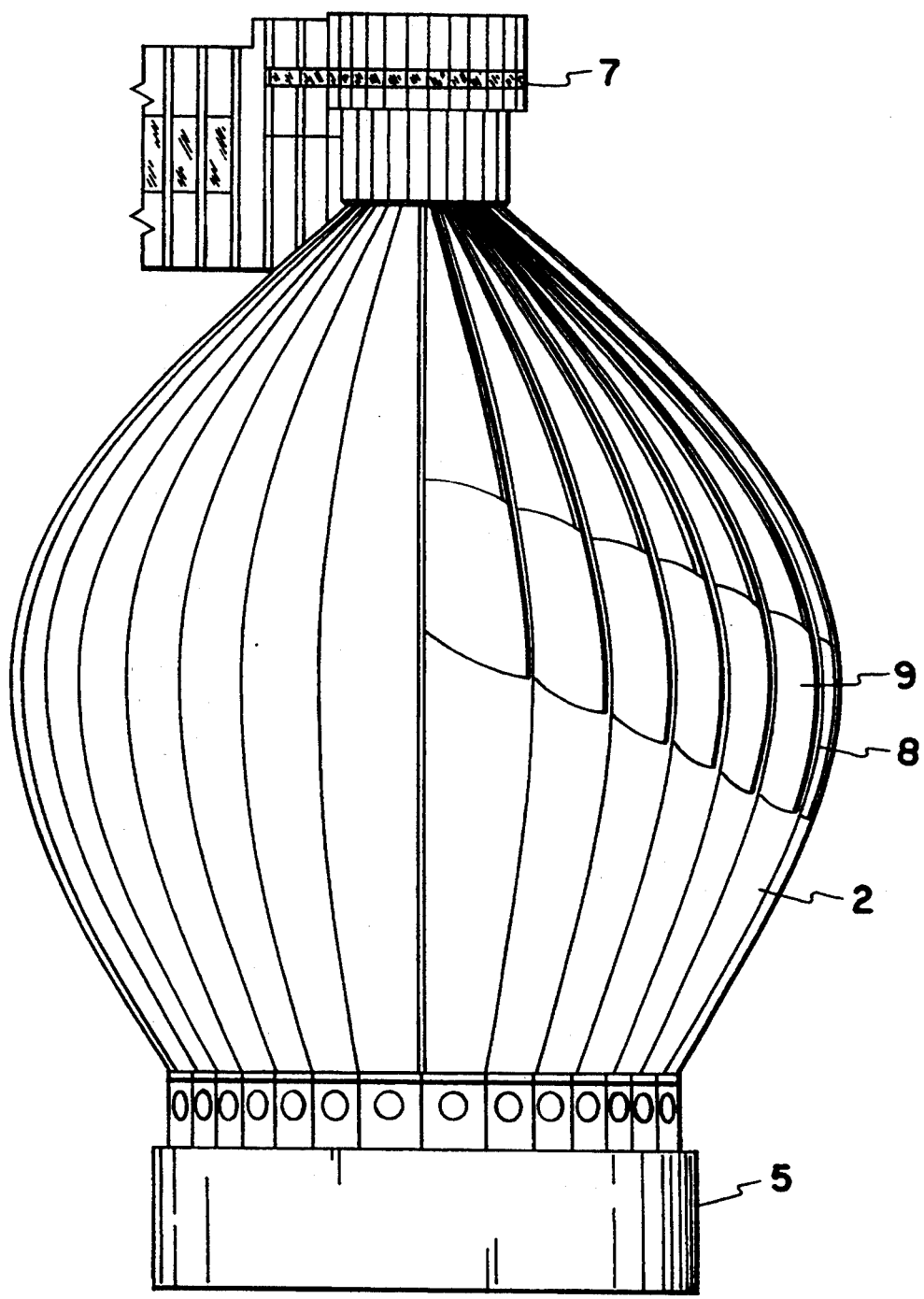
FIG. 2 is a vertical elevation view of the cladding system of FIG. 1 on such structure with cutaways showing hidden layers.

FIG. 2 illustrates in additional detail the cladding of membrane 2 over the curved structure, tank 1. The tank 1, as shown here, is supported by base 5 and is in contact with a portion of access structure 7. The cutaway portion of FIG. 2 reveals a series of means 8 for supporting the membrane 2 which are placed in a vertical orientation around the circumference of the curved tank and welded or otherwise fastened to the tank surface. In this preferred embodiment, these means 8 for supporting the membrane are ribs. Insulation 9 may be placed and retained between the ribs.

Figure 3:
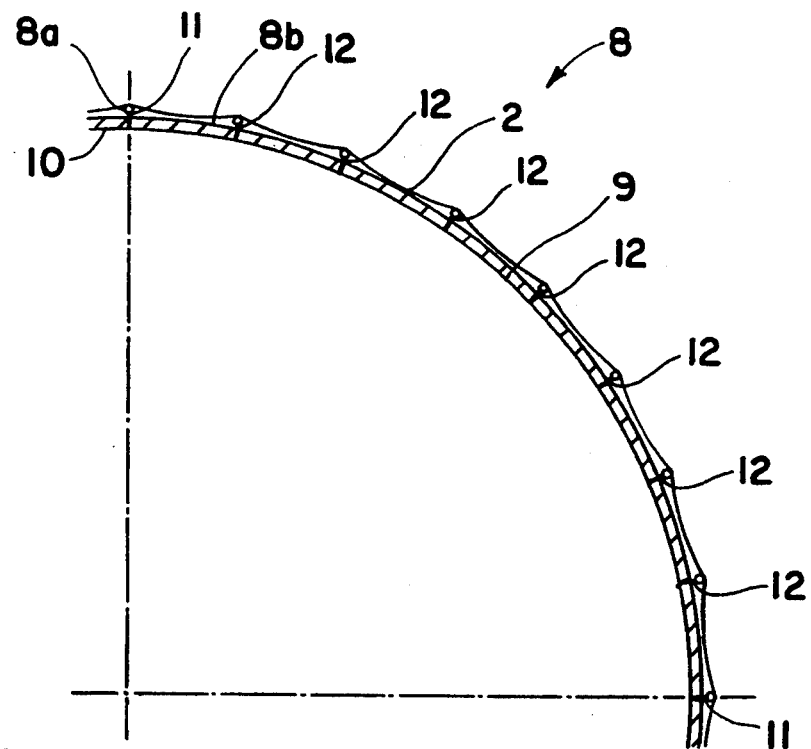
FIG. 3 is a sectional view, taken along line 2—2 of FIG. 2, showing the relationship of the cladding system components to the curved surface of the structure.

FIG. 3 is a quarter section resulting from a horizontal cut through a mid-portion of the tank. This figure shows tank surface 10 and the arrangement of a plurality of means 8 for supporting the membrane 2, insulation 9, and membrane 2 over the tank surface. First means 8a for supporting the membrane 2 is located at a first point on the tank surface and second means 8b for supporting the membrane 2 is located at a second point on the tank surface. The preferred means for supporting the membrane are ribs, in particular, the two preferred rib types are clamping ribs 11, which are topped by a clamping rib assembly (shown in FIG. 6) and standoff ribs 12, which are located at intermediate points between clamping ribs 11 in order to support the membrane panel spans.

While this vertical rib orientation (shown in FIG. 1) is the preferred means for supporting the membrane 2, and while the clamping assembly (shown in FIG. 6) is the preferred means for edge attachment, this invention is adaptable to other alternative support and attachment systems. For example, instead of metal ribs, other means for supporting and stressing the membrane include (but are not limited to) air filled tubes, pressurizing systems, and vacuum systems.

Figure 4:
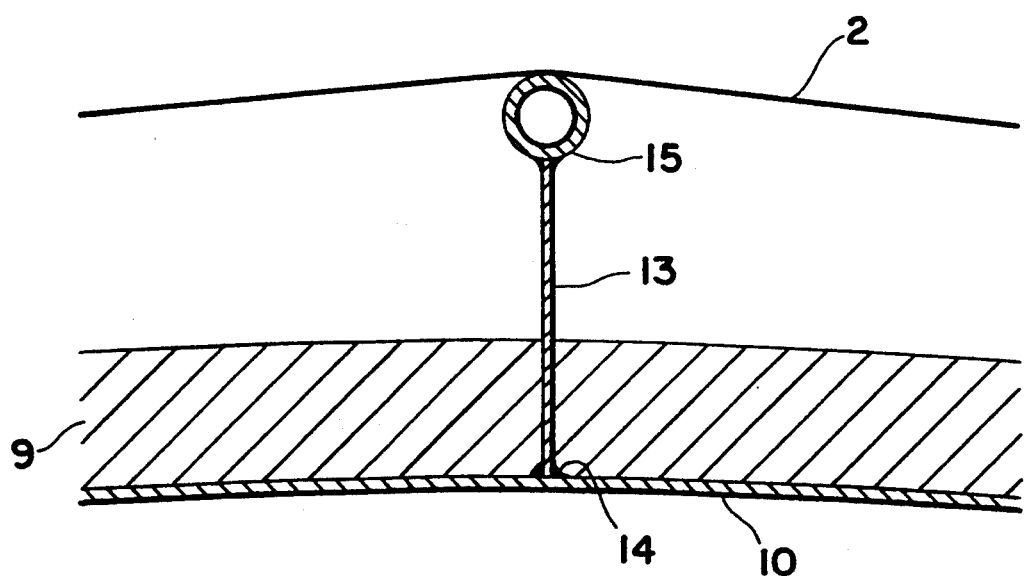
FIG. 4 is a detail of a standoff rib of the system of FIG. 1, in cross section.
Figure 5:
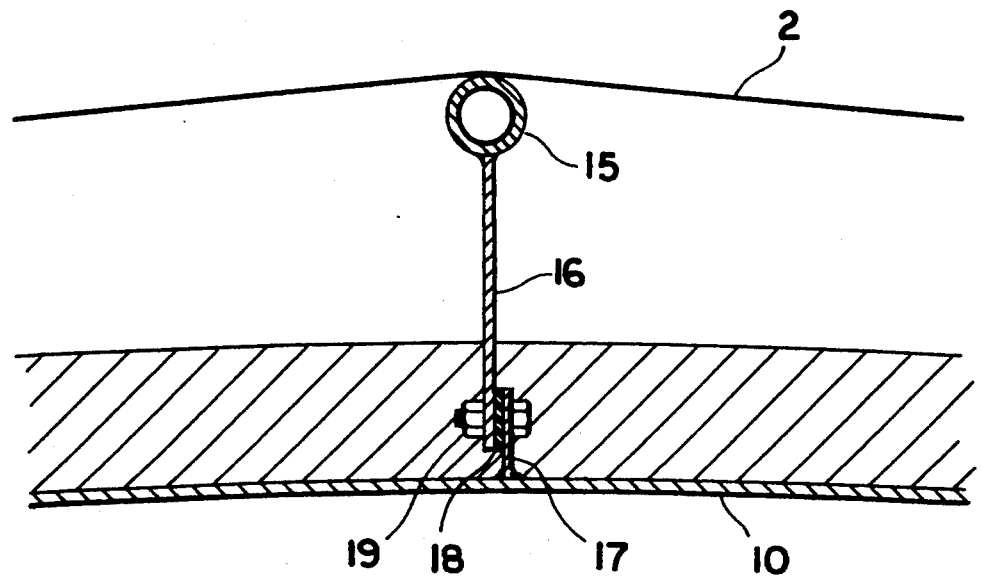
FIG. 5 is a detail of an alternative standoff rib, in cross section, with an insulating spacer strip.
Figure 6:
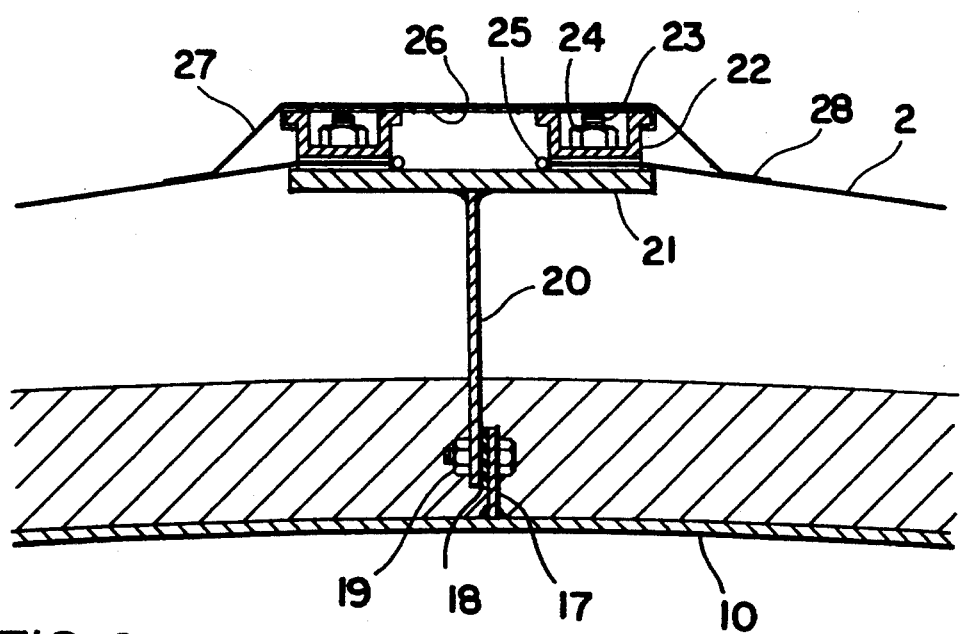
FIG. 6 is a detail of a clamping rib assembly of the system of FIG. 1, in cross section.

Referring to FIG. 3, cladding membrane 2 is shown as a continuous span because the scale is too large to show details of the discrete membrane panels and the joining methods of the panels to the ribs (but see FIGS. 4-6). However, in practice, panels of membrane 2 are designed and fabricated to span across a predesignated number of ribs. The number of ribs spanned depends upon the geometry of the structure and the applied loads. Standard engineering calculations and finite element analysis, may be used to establish the geometry of the structure and associated radius of curvature. Basic engineering principals can be used to determine the tension on the membrane due to the various stresses and strains inherent in the system. The spacing between the ribs and the depth of each rib required in order to support the membrane so that it can accommodate the various applied loads can also be readily determined.

The ribs will be spaced at a defined preferred placement distance. Generally, the panels are preferably cut and shaped to span a spanning area of at least about two ribs. In the preferred embodiment where both clamping and standoff ribs are used, the clamping and standoff ribs are placed such that some multiple of standoff ribs are placed between two clamping ribs.

Referring again to FIG. 3, it will be seen that, while the membrane 2 is tensioned across each placement distance (i.e., between each rib), an arc with a concave curvature is formed in the span. The concave curvature is another factor in the design; and the appropriate radius of the arc must be calculated in order to assure that the appropriate amount of space will exist between the tank's surface and the membrane, despite the effect of snow loads and wind suction. This airspace is necessary so that, despite applied loads, the membrane will not come in contact with the surface of the tank, which could abrade the membrane and provide a path for direct heat loss from the interior.

The fact that the membrane 2 will be completely supported is assured by the calculation of a minimum standoff depth. The minimum stand-off depth is a measurement which takes into consideration the geometry of the surface being clad and the tension in the membrane in the horizontal and vertical directions, which includes all deflections resulting from applied loads. Deflections due to wind suction, pressure, and snow loads are also accommodated. This calculation ensures that the appropriate airspace will exist between the surface of the tank and the arc of the cladding membrane. When insulation 9 is placed on the tank surface, the stand-off depth and the radius of the arc must be calculated factoring in this additional layer.

FIG. 4 further illustrates a cross-section of a standoff rib assembly consisting of a web 13 and weld 14 which attaches the rib to tank surface 10. The weld is a preferred means for mounting the rib to a steel tank; when the tank is constructed from concrete or other material(s), other attachment means (such as concrete embedment, e.g.) may be used.

Referring again to FIG. 4, tubular cap 15, welded to the distal edge of the web, is shown here as one embodiment of the preferred, non-abrasive stand-off surface of the outer reach of the rib; one may use other non-abrasive curved surfaces, such as a pipe. Insulation 9 may be added to any depth up to the height of the web.

FIG. 5 shows an alternative embodiment of the standoff rib. This embodiment includes an isolating two-part construction. Here, web 16 is not directly welded to the tank surface 10, but is attached to rib foot 17 which is welded to the tank surface. The two rib elements are periodically connected along the length of the rib by nut-and-bolt assembly 19 and separated for thermal isolation by insulating spacer strip 18.

Although the standoff member illustrated in the drawings is not connected to the tensioned cladding membrane, it will be apparent to those skilled in the art that the standoff member could be attached to the tensioned cladding member without departing from the spirit and scope of this invention.

FIG. 6 illustrates in cross-section one preferred construction of clamping rib assembly 20. The clamping rib assembly 20 is a preferred means for securing the cladding and means for edge attachment. The distal edge of the rib is capped with clamping plate 21 to which is fastened two clamping channels 22 which run the vertical length of the rib along the height through drilled holes by studs 23, which are affixed to the plate and tightened down by nuts 24. This arrangement provides a long continuous clamping surface into which continuous edges of the membrane panels are encapsulated and secured. In this embodiment, neoprene gaskets are mounted to the clamping channels in order to improve continuity of the clamping force.

The area near the panel edges may be drilled or punched at intervals to enable placement over the clamping plate studs 23. As a result, each panel edge is terminated in a lapped seam containing roped edge 25, which is typically a cord or rope section placed into the lap which is then secured in the factory operation by a heat sealing process. The roped edge provides a gripping surface for stretching the membrane panels into place across a spanning area and for securing the panel in the clamped condition.

The membrane panels are preferably stretched in the field by means of leveraged tensioning devices, the preferred means for tensioning the section of cladding membrane, or pressure differential devices. However, other support and/or attachment systems may be used to provide positive or negative pressure. For example, instead of metal ribs, other means for supporting and stressing the membrane include but are not limited to air filled tubes, pressurizing systems, and vacuum systems.

Referring again to the preferred leveraged tensioning devices illustrated in the drawings, tension on the panels is preferably calculated and generated to precisely balance forces around the circumference of the structure by cutting the panels to slightly smaller dimensions than the placement distance. The stretch compensation factor is calculated as a percentage of any given panel dimension. For a poly(tetrafluoroethylene)-coated membrane the stretch compensation factor is on the order of single-digit percentages, and is preferably of a value of approximately one-half percent to about four percent. Calculation of the stretch compensation factor relies on taking into account the biaxial elongation and the inherent stretch and resistance of the membrane in order to bring the panels to the desired prestress. Thus, membrane panels are cut to a size whose area is equal to that of the spanning area, reduced by a stretch compensation factor.

While the clamping configuration may be achieved in various ways, a preferred embodiment is shown in FIG. 6. In addition, FIG. 6 shows that the entire assembly may be further sealed from the outside elements. Semi-rigid cap channel 26 may be configured conveniently to span and snap over the outer edges of the clamping channels, as shown. Fabric closure strip 27 is preferably placed over the clamping rib, vertically along the entire length, and is secured over the length of the clamping rib by heat sealing it to the membrane at mating surface 28. The clamping rib may be welded directly to tank surface 10. However, the embodiment of the clamping rib, as shown in FIG. 6, illustrates the clamping rib attached to rib foot 17 which in turn is welded to the tank surface. Here, rib foot 17 is welded to tank surface 10 and periodically connected along the length of the clamping rib by nut-and-bolt assembly 19. In addition, in this embodiment, the clamping rib and the rib foot are separated for thermal isolation by insulating spacer strip 18.

Figure 7:
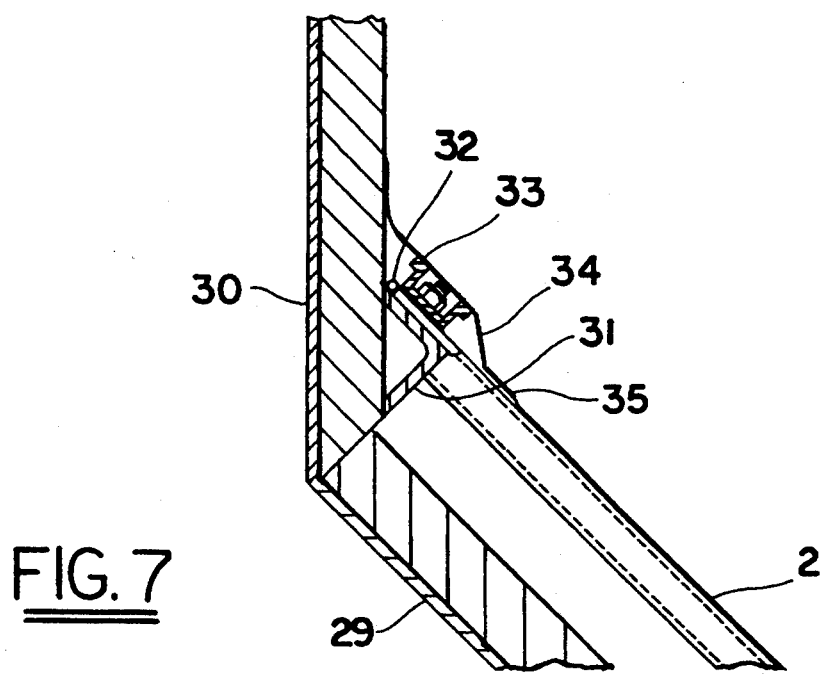
FIG. 7 is a detail, in cross section, of the top closure clamp of the system of FIG. 1.

At the tops and bottoms of the cladding membrane 2, thus placed around the circumference of the structure, similar clamping systems are provided in ring fashion. FIG. 7 shows, in cross section, the upward curvature of tank wall 29 at its interface with the vertical side of tank cap 30. Supported around the tank collar in proximity of the interface of the surfaces is angle collar bracket 31 which supports a spaced series of studs which in turn fasten down clamping channel 33. The upper edge of the membrane panels terminate in roped edge 32 that is stretched and clamped by clamping channel 33 in similar fashion to that described in the vertical applications preceding. Weather cover 34 is heat sealed to the membrane body at surface 35, also in similar fashion to the vertical seams. Support for the angle bracket is not fully shown, but will be understood by those versed in metal construction techniques to employ standard methods of welding or like securing means to the body of the structure.

Figure 8:
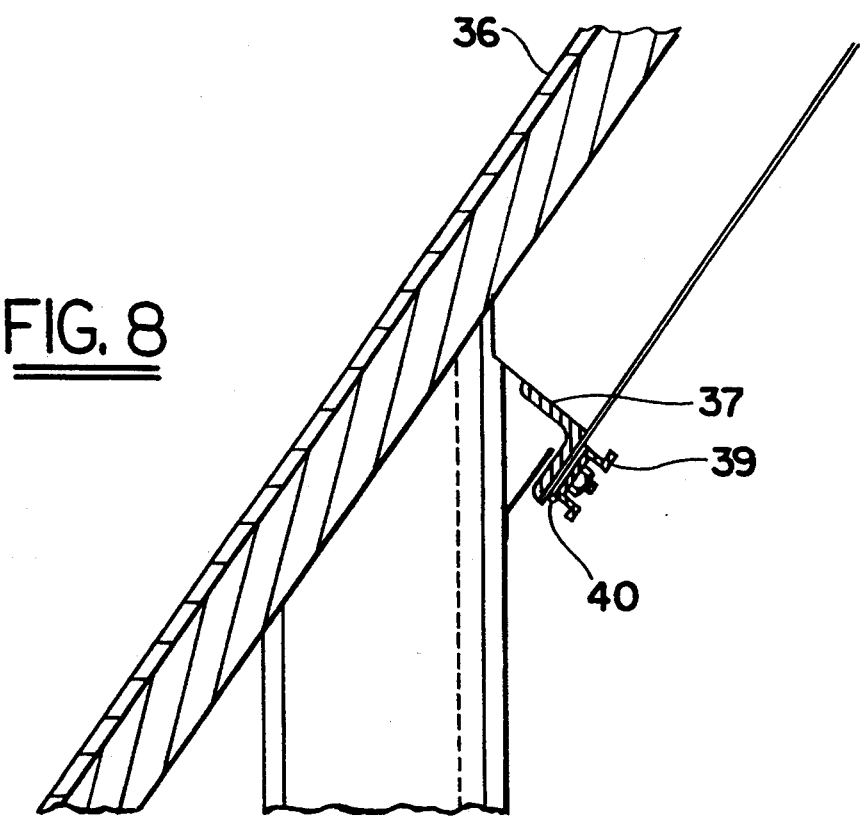
FIG. 8 is a detail, in cross section, of the bottom closure clamp of the system of FIG. 1.

Similarly, at the bottom, FIG. 8 shows angle collar bracket 37 fastened by standard construction means to tank surface 36 near its interface with the lower base collar. Again, the collar bracket has spaced studs for retention of bottom collar channel, and the channel in turn secures the stretched and tensioned edge welt and is tightened down. Flashing 38 is provided to further seal and secure the joint from the elements.

We claim:

1. A structure comprised of an exterior surface which is both vertically and circumferentially curved, wherein said exterior surface is clad with an integral, tensioned cladding membrane which has a proximal end, a distal end, and an intermediate portion disposed between said proximal end and said distal end, and wherein:
    (a) said tensioned cladding membrane is not contiguous with said exterior surface of said structure;
    (b) said tensioned cladding membrane consists essentially of coated fabric material;
    (c) said structure is comprised of a first tensioned cladding membrane attachment member which is contiguous with and attached to said proximal end, a second tensioned cladding membrane attachment member which is contiguous with and attached to said distal end, and a first standoff member which is contiguous with said intermediate portion of said tensioned cladding membrane and is disposed between said exterior surface of said structure and said intermediate portion; and
    (d) from said proximal end of said tensioned cladding membrane to said first standoff member, said tensioned cladding membrane forms an arc with a substantially concave curvature.

2. The structure as recited in claim 1, wherein said exterior surface is substantially egg-shaped.

3. The structure as recited in claim 1, wherein insulating material is disposed between said exterior surface of said structure and said tensioned cladding membrane.

4. The structure as recited in claim 1, wherein said structure is comprised of means for attaching said first stand-off member to said exterior surface of said structure.

5. The structure as recited in claim 1, wherein said first standoff member is a first standoff rib.

6. The structure as recited in claim 5, wherein said structure is comprised of a second standoff rib.

7. The structure as recited in claim 1, wherein said tensioned cladding membrane is comprised of a fabric substrate.

8. The structure as recited in claim 7, wherein said fabric substrate consists essentially of fiberglass fabric.

9. The structure as recited in claim 8, wherein said fiberglass fabric substrate is coated with a fluorocarbon polymeric material.

10. The structure as recited in claim 9, wherein said fiberglass fabric substrate is coated with polytetrafluoroethylene.

11. The structure as recited in claim 1, wherein each of said first tensioned cladding membrane attachment member and said second tensioned cladding membrane attachment member is comprised of a clamping rib.

12. The structure as recited in claim 11, wherein each of said first tensioned cladding membrane attachment member and said second tensioned cladding membrane attachment member is comprised of a clamping rib assembly mounted to a clamping rib.

13. The structure as recited in claim 12, wherein said clamping rib assembly is comprised of a clamping plate and a clamping channel.

14. The structure as recited in claim 13, wherein said clamping rib assembly comprises at least one stud, and at least one nut, and wherein:
    (a) said tensioned cladding membrane is placed between said clamping channel, and
    (b) said stud extends from said clamping plate through said tensioned cladding membrane and said clamping channel and is secured in place by said nut.

15. The structure as recited in claim 1, wherein said structur is comprised of a rib foot which is attached to said exterior surface.

16. The structure as recited in claim 1, wherein said structur is comprised of a semi-rigid cap channel.

17. The structure as recited in claim 1, wherein said structure is comprised of a second standoff member which is contiguous with said intermediate portion of said tensioned cladding membrane and is disposed between said exterior surface of said structure and said intermediate portion.

18. The structure as recited in claim 17, wherein said structure is comprised of a third standoff member which is contiguous with said intermediate portion of said tensioned cladding membrane and is disposed between said exterior surface of said structure and said intermediate portion.

19. The structure as recited in claim 18, wherein said structure is comprised of a fourth standoff member which is contiguous with said intermediate portion of said tensioned cladding membrane and is disposed between said exterior surface of said structure and said intermediate portion.

* * * * *